(12) United States Patent
Hunt et al.

(10) Patent No.: US 12,374,734 B2
(45) Date of Patent: Jul. 29, 2025

(54) BATTERY CELL WITH INTERNAL SWELLING RELIEF AND EXTERNAL COOLING FEATURES

(71) Applicant: Dyson Technology Limited, Wiltshire (GB)

(72) Inventors: Ian Andrew Hunt, Bristol (GB); Alex Madsen, Swindon (GB)

(73) Assignee: Dyson Technology Limited, Malmesbury (GB)

( * ) Notice: Subject to any disclaimer, the term of this patent is extended or adjusted under 35 U.S.C. 154(b) by 527 days.

(21) Appl. No.: 17/785,888

(22) PCT Filed: Dec. 4, 2020

(86) PCT No.: PCT/GB2020/053125
§ 371 (c)(1),
(2) Date: Jun. 15, 2022

(87) PCT Pub. No.: WO2021/130471
PCT Pub. Date: Jul. 1, 2021

(65) Prior Publication Data
US 2023/0019975 A1    Jan. 19, 2023

(30) Foreign Application Priority Data

Dec. 16, 2019 (GB) ...................... 1918465
Dec. 16, 2019 (GB) ...................... 1918466

(51) Int. Cl.
*H01M 10/00* (2006.01)
*H01M 10/613* (2014.01)
(Continued)

(52) U.S. Cl.
CPC ....... *H01M 10/613* (2015.04); *H01M 10/647* (2015.04); *H01M 10/6551* (2015.04);
(Continued)

(58) Field of Classification Search
CPC ............. H01M 10/613; H01M 10/647; H01M 10/6551; H01M 50/136; H01M 50/204;
(Continued)

(56) References Cited

U.S. PATENT DOCUMENTS 6,175,213 B1    1/2001   Centa et al.
6,187,472 B1    2/2001   Shiota et al.
(Continued)

FOREIGN PATENT DOCUMENTS

CN         1728436 A     2/2006
CN       101286581 A    10/2008
(Continued)

OTHER PUBLICATIONS

Machine translation of EP-2200109, obtained Jan. 2025 (Year: 2009).*

(Continued)

*Primary Examiner* — Nicholas P D'Aniello
(74) *Attorney, Agent, or Firm* — Tucker Ellis LLP; Michael G. Craig

(57) ABSTRACT

A battery cell including an electrode assembly contained within a housing. The electrode assembly shrinks and/or swells depending on a charge/discharge cycle of the cell. A swelling compensation member configured to shrink upon swelling of the electrode assembly, and expand upon on shrinking of the electrode assembly is in continuous contact with the electrode assembly and an innermost surface of the housing. A first portion of the innermost surface of the housing is in contact with the swelling compensation member, and a second portion is free from contact with the swelling compensation member. The battery cell includes a cooling member in thermal contact with the outermost surface of the housing. Part of the outermost surface of the housing in contact with the cooling member corresponds to
(Continued)

a part of the innermost surface of the housing which is free from contact with the swelling compensation member.

10 Claims, 3 Drawing Sheets

(51) Int. Cl.
  *H01M 10/647* (2014.01)
  *H01M 10/6551* (2014.01)
  *H01M 50/136* (2021.01)
  *H01M 50/204* (2021.01)
  *H01M 50/242* (2021.01)

(52) U.S. Cl.
  CPC ....... *H01M 50/136* (2021.01); *H01M 50/204* (2021.01); *H01M 50/242* (2021.01)

(58) Field of Classification Search
  CPC ........... H01M 50/242; H01M 50/1243; H01M 50/211; H01M 50/682
  See application file for complete search history.

(56) References Cited

U.S. PATENT DOCUMENTS

| | | | |
|---|---|---|---|
| 6,392,172 B1 | 5/2002 | Azema | |
| 6,524,741 B1 | 2/2003 | Bryan | |
| 6,653,018 B2 | 11/2003 | Takahashi et al. | |
| 7,511,456 B2 | 3/2009 | Lee et al. | |
| 7,618,724 B2 | 11/2009 | Kim et al. | |
| 7,935,439 B2 | 5/2011 | Kim | |
| 8,003,240 B2 | 8/2011 | Cherng | |
| 8,193,770 B2 | 6/2012 | Zheng et al. | |
| 8,216,708 B2 | 7/2012 | Jang et al. | |
| 8,268,477 B2 | 9/2012 | Lee et al. | |
| 8,592,066 B2 | 11/2013 | Baek | |
| 8,715,861 B2 | 5/2014 | Suga et al. | |
| 8,900,734 B2 | 12/2014 | Hosaka et al. | |
| 8,927,139 B2 | 1/2015 | Kim | |
| 9,005,786 B2 | 4/2015 | Farmer | |
| 9,099,761 B2 | 8/2015 | Hong | |
| 9,356,262 B2 | 5/2016 | Kim et al. | |
| 9,431,647 B2 | 8/2016 | Choi et al. | |
| 9,472,801 B2 | 10/2016 | Choi et al. | |
| 9,774,026 B2 | 9/2017 | Shin | |
| 10,090,508 B2 | 10/2018 | Kang | |
| 10,109,842 B2 | 10/2018 | Ahn et al. | |
| 10,193,189 B2 | 1/2019 | Choi et al. | |
| 10,224,534 B2 | 3/2019 | Min et al. | |
| 10,276,902 B2 | 4/2019 | Park et al. | |
| 10,320,037 B2 | 6/2019 | Choi et al. | |
| 10,665,836 B2 | 5/2020 | Cho et al. | |
| 10,741,822 B2 | 8/2020 | Cho et al. | |
| 10,749,162 B2 | 8/2020 | Noue et al. | |
| 10,770,712 B2 | 9/2020 | Kim et al. | |
| 10,854,869 B2 | 12/2020 | Bazzarella et al. | |
| 2004/0110061 A1 | 6/2004 | Haug et al. | |
| 2006/0093897 A1 | 5/2006 | Choi et al. | |
| 2009/0123833 A1 | 5/2009 | Mao et al. | |
| 2011/0086253 A1 | 4/2011 | Pompetzki et al. | |
| 2011/0104520 A1 | 5/2011 | Ahn | |
| 2013/0337300 A1 | 12/2013 | Saito | |
| 2015/0221996 A1 | 8/2015 | Jin | |
| 2016/0087319 A1 | 3/2016 | Roh et al. | |
| 2016/0141565 A1 | 5/2016 | Uhm et al. | |
| 2020/0343498 A1* | 10/2020 | Schuessler | H01M 10/4207 |

FOREIGN PATENT DOCUMENTS

| | | |
|---|---|---|
| CN | 101640294 A | 2/2010 |
| CN | 101373822 B | 11/2010 |
| CN | 203103384 U | 7/2013 |
| CN | 105229823 A | 1/2016 |
| CN | 103296305 B | 2/2017 |
| DE | 102008061755 A1 | 6/2010 |
| DE | 102010043710 A1 | 5/2012 |
| EP | 2200109 A2 | 6/2010 |
| EP | 2602840 A2 | 6/2013 |
| EP | 3157074 A1 | 4/2017 |
| JP | 04-147574 A | 5/1992 |
| JP | 2000-067846 A | 3/2000 |
| JP | 2000-197260 A | 7/2000 |
| JP | 2001-210388 A | 8/2001 |
| JP | 2001-351590 A | 12/2001 |
| JP | 2002-298830 A | 10/2002 |
| JP | 2003-045492 A | 2/2003 |
| JP | 2004-311073 A | 11/2004 |
| JP | 2005-044523 A | 2/2005 |
| JP | 2016-511509 A | 4/2016 |
| JP | 2016-522546 A | 7/2016 |
| JP | 2019-021384 A | 2/2019 |
| KR | 10-0670472 B1 | 1/2007 |
| KR | 10-0874402 B1 | 12/2008 |
| KR | 10-2013-0014250 A | 2/2013 |
| KR | 10-1404704 B1 | 6/2014 |
| KR | 10-1472167 B1 | 12/2014 |
| KR | 10-1487152 B1 | 1/2015 |
| KR | 10-1551021 B1 | 9/2015 |
| KR | 10-1792820 B1 | 11/2017 |
| KR | 10-2288097 B1 | 8/2021 |
| WO | 2017/158950 A1 | 9/2017 |
| WO | 2019/189007 A1 | 10/2019 |

OTHER PUBLICATIONS

International Search Report and Written Opinion received for PCT Patent Application No. PCT/GB2020/053125, mailed on Mar. 2, 2021, 9 pages.
Office Action received for GB Application No. 1918466.2, mailed on Jan. 10, 2022, 1 page.
Office Action received for GB Application No. 1918466.2, mailed on Mar. 25, 2022, 1 page.
Search Report received for GB Application No. 1918466.2, mailed on May 19, 2020, 1 page.
Office Action received for Japanese Patent Application No. 2022-536815, mailed on Aug. 29, 2023, 6 pages (3 pages of English Translation and 3 pages of Original Document).

* cited by examiner

BATTERY CELL WITH INTERNAL SWELLING RELIEF AND EXTERNAL COOLING FEATURES

TECHNICAL FIELD

The present disclosure relates to a battery cell having internal swelling relief and external cooling features. In particular, the present disclosure relates to a battery cell having internal swelling relief and an external cooling member in contact with the housing of the battery cell.

BACKGROUND

Secondary, or re-chargeable, batteries are commonly used in all types of portable electrical devices such as mobile phones, laptops, personal care devices, home care devices and electric vehicles. The operational performance and longevity of secondary batteries is crucial to the quality of the product offering and to the perceived value for money to the end-user.

The key performance features of a secondary battery from the end-user's perspective are the amount of electrical power that the battery can store and its ability to take on charge quickly. It is well known in the field of secondary battery technology that rapid charging and discharging of the battery can reduce the life-span of the battery. It is also known that charging and discharging at elevated temperatures can damage the battery, thereby reducing its life or even causing catastrophic failure.

Another common problem with secondary batteries is loss of electrolyte over time, generally caused by electrolyte oxidation. As the amount of electrolyte in the battery decreases, the capacity and life-span of the battery decrease along with it.

A further well-known characteristic of secondary batteries is that the electrodes (typically the anode) can swell and shrink as the battery moves through the charge/discharge cycles. The swelling or shrinking of the electrodes may take place upon charging or discharging of the battery depending on the specific battery chemistry. Some battery chemistries cause greater amounts of swelling/shrinking than others. The electrodes can also swell throughout their lifetime.

Account must be taken of electrode swelling/shrinking characteristics in secondary battery design. Traditionally, secondary battery cells are cased in rigid housings with fixed dimensions. To avoid causing over-stress and damage to the housing due to electrode swelling, rigid housings must be sized to accommodate electrode swelling. However, a certain amount of pressure must be maintained on the electrode assembly in order to maintain battery performance, and this pressure can be diminished by electrode shrinking. There is therefore a balance to be achieved between these two opposing design requirements.

SUMMARY OF THE INVENTION

The present invention provides a battery comprising a cell assembly comprising an electrode assembly and an electrolyte, a housing containing the cell assembly, a battery comprising a swelling compensation member, and a cooling member in thermal contact with the outermost surface of the housing; the swelling compensation member is configured to be in contact with the electrode assembly and an innermost surface of the housing, such that a first portion of the innermost surface of the housing is in contact with the swelling compensation member, and a second portion of the innermost surface of the housing is free from contact with the swelling compensation member, wherein at least a part of the outermost surface of the housing in contact with the cooling member corresponds to at least part of the innermost surface of the housing which is free from contact with the swelling compensation member.

In use, the electrode assembly shrinks and/or swells in dependence on a charge/discharge cycle of the cell assembly. Advantageously, the swelling compensation member is able to shrink upon swelling of the electrode assembly and to expand upon shrinking of the electrode assembly to reduce any external dimensional change effect and to maintain compression of the electrode assembly regardless of its swelling condition. Because the swelling compensation member comprises a sponge like material having a porous structure, the swelling compensation member acts as a thermal insulator which is beneficial to help prevent heat transfer from the battery cell to other components, or other battery cells. The location of the swelling compensation member is selected to best suit the location of the cooling member to ensure optimal heat transfer away from the battery cell whilst still providing thermal insulation in other areas of the battery cell.

The swelling compensation member optionally comprises a material having an at least semi-open porous structure, and wherein, in use, the swelling compensation member is configured to shrink in at least one dimension upon swelling of the electrode assembly, and to expand in at least one dimension upon on shrinking of the electrode assembly Optionally, the pores of the swelling compensation member contain electrolyte for use in the battery cell. Electrolyte contained in the pores of the swelling compensation member is able to replenish any electrolyte lost over time during operation of the battery cell to both extend the life and maintain the performance of the battery cell.

The battery cell may comprise one or more swelling compensation members to best suit the battery cell design.

The housing may comprise a flexible pouch material or a substantially rigid material.

The electrode assembly may comprises a jelly roll or a stack as are well known in the art.

The housing may optionally be substantially cuboid in form such that the housing comprises three pairs of substantially opposing side walls which pairs are substantially normal to one another, wherein the cooling member is substantially parallel to a first pair of side walls, and wherein the swelling compensation member is substantially parallel to a second or a third pair of side walls. In other words, the housing comprises a first pair of substantially opposing first side faces which are substantially parallel to a first plane, a second pair of substantially opposing second side faces which are substantially parallel to a second plane, and a third pair of substantially opposing third side faces which are substantially parallel to a third plane, wherein the first, second and third planes are substantially normal to one another, wherein the cooling member is substantially parallel to the first plane, and wherein the swelling compensation member is substantially parallel to the second or third plane. This arrangement helps to ensure minimum overlap between the insulating swelling compensation member and the cooling member.

Optionally two or more battery cells may be arranged side by side and share a common cooling member for a compact battery design.

The cooling member optionally comprises one or more cooling fins located between first and second neighbouring cells, wherein each cooling fin is in thermal contact with a second side face of the first cell and a second side face of the second cell, wherein the second side faces of the first and second cells in contact with the cooling fin(s) are cooling side faces of the first and second cells respectively. This arrangement provides cooling fins between battery cells to optimise heat transfer.

Optionally the innermost surface of the cooling side face of the first cell, and the innermost surface of the cooling side face of the second cell are free from contact with the respective swelling compensation member of the first and second cells. This arrangement prevents overlap between the insulating swelling compensation members and the cooling fins.

A third battery cell may optionally be located side by side and neighbouring with the second battery cell such that a second side face of the third cell is adjacent to a second side face of the second cell, wherein the adjacent side faces of the second and third cells are insulating side faces of the second and third cells respectively, wherein the innermost surface of the insulating side face of the third cell and the innermost surface of the insulating side face of the second cell are in contact with the respective swelling compensation member of the second and third cells. This arrangement advantageously locates the insulating swelling compensation members of neighbouring cells next to one another to help prevent thermal transfer between cells.

An alternative is provided as a battery comprising a cell assembly comprising an electrode assembly and an electrolyte, and a housing containing the cell assembly, the battery further comprising a swelling compensation member comprising a material having an at least semi-open porous structure, with at least some of the pores of the containing electrolyte, wherein, in use, the swelling compensation member is configured to shrink in at least one dimension upon swelling of the electrode assembly, and to expand in at least one dimension upon on shrinking of the electrode assembly, and wherein the swelling compensation member is configured to be in continuous contact with the electrode assembly throughout each charge/discharge cycle of the battery cell.

In this alternative, advantageously, the swelling compensation member is able to shrink upon swelling of the electrode assembly and to expand upon shrinking of the electrode assembly to reduce any external dimensional change effect and to maintain compression of the electrode assembly regardless of its swelling condition. Furthermore, the electrolyte contained in the pores of the swelling compensation member is able to replenish any electrolyte lost over time during operation of the battery cell to both extend the life and maintain the performance of the battery cell.

In this alternative the swelling compensation member optionally is located between an innermost surface of the housing and the electrode assembly, wherein the swelling compensation member is configured to be in continuous contact with the innermost surface of the housing throughout each charge/discharge cycle of the battery cell. This location of the swelling compensation member helps to minimise external dimensional change. In addition, because the swelling compensation member comprises a sponge like material having a porous structure, the swelling compensation member acts as a thermal insulator. Location of the swelling compensation member next to the housing therefore helps to thermally insulate the battery cell. This is particularly beneficial when a number of battery cells are located alongside one another to prevent thermal run-away in one battery cell spreading to neighbouring battery cells.

In this alternative, the battery cell optionally comprises one or more swelling compensation members to enable optimisation of the position and efficacy of the swelling compensation and electrolyte replenishing according to the specific battery cell configuration.

In this alternative the housing may comprises a flexible pouch material or a substantially rigid material.

In this alternative, the electrode assembly may comprises a jelly roll or a stack as are well known in the art.

Optionally in this alternative, a first portion of the innermost surface of the housing is in contact with the swelling compensation member, and a second portion of the innermost surface of the housing is free from contact with the swelling compensation member. In this way, the location of the swelling compensation member can be selected to best suit the location of any cooling members located next to the external surfaces of the housing.

In another alternative aspect there is a method of replenishing electrolyte in an electrode assembly, the method comprising: installing a battery cell as described above in an electrical device; using the battery cell to supply electrical energy to the electrical device; and providing electrolyte to the electrode assembly from the pores of the swelling compensation member.

Optionally in this alternative, the electrolyte is provided to the electrode assembly upon shrinkage of the swelling compensation member and/or upon expansion of the swelling compensation member.

In this alternative, the electrolyte may be provided to the electrode assembly by capillary action.

BRIEF DESCRIPTION OF THE DRAWINGS

The present invention will now be described by way of non-limiting examples with reference to the following figures, in which.

DETAILED DESCRIPTION

Figure 1:
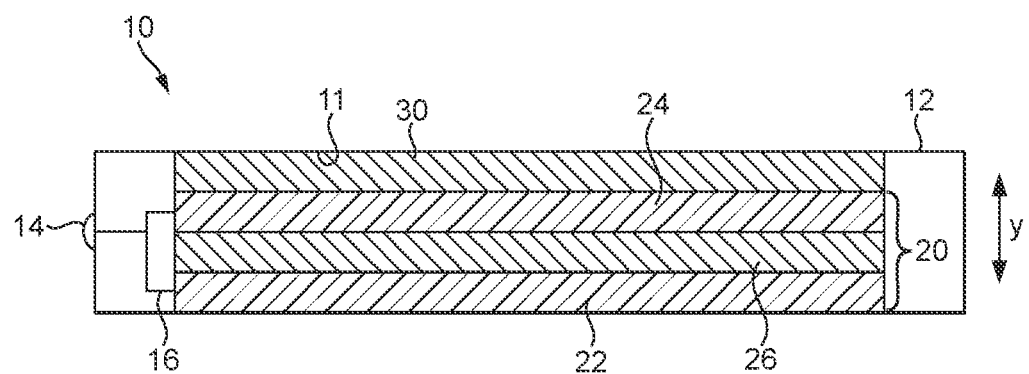
FIG. 1 shows a schematic cross-section of a battery cell having internal swelling relief.

A schematic cross-sectional illustration of a battery cell 10 is shown in FIG. 1. The battery cell 10 comprises a housing 12 within which is located an electrode assembly 20. The electrode assembly 20 comprises a first electrode 22 and a second electrode 24 separated from one another by a separator 26.

As is well-known in battery technology, the first and second electrodes 22, 24 comprise electrical conductors of differing electrode potential. A suitable electrolyte (not shown) is located within the housing 12. Typically the electrolyte comprises a liquid or a gel and resides within the separator 26 which has an open porous structure. For example, the separator 26 may comprise a porous solid or woven material. Typical secondary battery cells chemistries include lithium-metal and lithium-ion cells as is well known in the art.

The first and second electrodes 22, 24, and the separator 26, typically have a thin film type construction. In the example shown in FIG. 1, the electrode assembly 20 is shown as a stack of layers comprising a single first electrode 22 (for example a cathode), a single second electrode 24 (for example an anode) and a single layer of separator material 26. Each electrode 22, 24 is attached to an electrical connection tab 16 (for example by an ultrasonic or spot weld) which lead to external electrical contacts 14 located on the outside of the housing 12. When the external electrical contacts 14 are connected in a circuit, ions flow from one electrode to the other through the electrolyte to provide electrical power to the circuit and an electrical device attached thereto. To charge the battery cell, the flow of electrical current is reversed.

Figure 2:
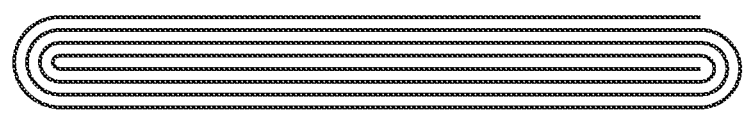
FIG. 2 shows a schematic end view of a "jelly-roll" type electrode assembly.

As described above, the configuration of the electrode assembly 20 shown in FIG. 1 comprises two electrodes 22, 24 separated by a single separator 26. However, it will be understood that this is a simplified example only and that other electrode assembly configurations are possible. For example, the electrode assembly 20 may comprise a plurality of first electrodes 22 and a corresponding plurality of second electrodes 24, each separated by a separator layer 26 in a multi-electrode, multi-separator stack. In this case, each of the plurality of electrodes 22, 24 has an electrical connection tab 16 leading from the electrode to the corresponding external electrical contact 14. Alternatively or additionally, the electrode assembly 20 may be rolled up to form a generally cylindrical electrode assembly. Such an assembly would typically be located in a cylindrical housing to form a cylindrical battery cell. Another common electrode assembly configuration is a "jelly-roll" in which the thin film stack (or stacks) is rolled in a flattened spiral as illustrated schematically in FIG. 2. A "jelly-roll" electrode assembly is typically, although not exclusively, used in pouch cell batteries.

Referring once again to FIG. 1, the battery cell 12 also comprises a swelling compensation member 30 located between the electrode assembly 20 and the inner surface 11 of the housing 12. The swelling compensation member 30 comprises a resilient material and is configured to be in continuous contact with the electrode assembly 20. Example materials include foams, sponge like materials, and woven materials. The resilient behaviour of the swelling compensation member 30 need not be linear.

As discussed above, in use, during charging/discharging of the battery cell 10, the electrode assembly 20 may swell or shrink. In the example shown in FIG. 1, the swelling/shrinking is generally in a direction Y normal to the electrode assembly 20. The swelling compensation member 30 is configured to shrink in the Y direction upon swelling of the electrode assembly 20 and to expand in the Y direction upon shrinking of the electrode assembly 20. In other embodiments, the electrode assembly 20 may swell in one or more other directions in addition to, or instead of, the Y direction shown in FIG. 1. The swelling compensation member 30 can be configured to expand/shrink in any direction as necessitated by the particular electrode assembly 20 swell/shrink characteristic.

The swelling compensation member 30 may be attached to the electrode assembly 20 and/or to the inner surface 11 of the housing 12 by mechanical fasteners and/or adhesive. Alternatively, the swelling compensation member 30 may simply be located between the electrode assembly 20 and/or the inner surface 11 of the housing 12 without physical attachment to either. The swelling compensation member 30 may be under compression in all swelling conditions of the electrode assembly 20 such that it is substantially held in place between the electrode assembly 20 and the inner surface 11 of the housing 12 by the resilient restoring force as the swelling compensation member 30 seeks to regain its uncompressed form. A biasing member (not shown) may be provided to bias the swelling compensation 30 member towards the housing 12 and/or electrode assembly 20.

Because the swelling compensation member 30 is configured to shrink upon swelling of the electrode assembly 20, and to expand upon shrinking of the electrode assembly 20, the external dimensions of the battery cell housing 12 can be protected from dimensional change caused by the swelling/shrinking of the electrode assembly 20 since dimensional change of the electrode assembly is taken up by the swelling compensation member 30.

In the example described above, a swelling compensation member 30 is only provided on one side of the electrode assembly 20. However, it will be understood that more than one swelling compensation member 30 may be provided and may be located between any part of the electrode assembly 20 and the inner surface 11 of the battery cell housing 12 as required. Alternatively or additionally, one or more swelling compensation members 30 may be provided within the electrode assembly 20. For example, within an electrode stack (between electrode pairings), or within a rolled electrode assembly. The swelling compensation member 30 may comprise one continuous member which partially or substantially fully surrounds the electrode assembly 20. Furthermore, it will be understood that the electrode assembly 20 may have any suitable configuration such as stacked, rolled or jelly-rolled, and that the housing 12 may be rigid or a flexible pouch, and may have any suitable form such as cuboid, rounded-cuboid or cylindrical.

In one example, the swelling compensation member 30 comprises a resilient material having an open porous structure capable of containing the electrolyte of the battery cell. In such an example, the electrolyte is able to move from the pores of the swelling compensation member 30 to the separator 26, and vice versa, as the swelling compensation member shrinks and expands in use. If the battery cell 10 should lose electrolyte over the course of its life due to oxidation, the electrolyte contained in the swelling compensation member 30 can replace the lost electrolyte thereby extending the life of the battery cell 10.

A suitable material for the swelling compensation member 30 is ethylene propylene diene monomer (EPDM) foam having a semi-open porous structure in which some of the pores have a closed structure and some of the pores have an open interconnected structure. Sponges or foams having a semi-open porous structure such as this are useful as the elastic behaviour of the closed pores help to maintain dimensional stability and electrode assembly compression during swelling and shrinking of the electrode assembly 20, and the open interconnected pores are suited to containing and dispensing the electrolyte during the life of the battery cell 10.

Figure 3:
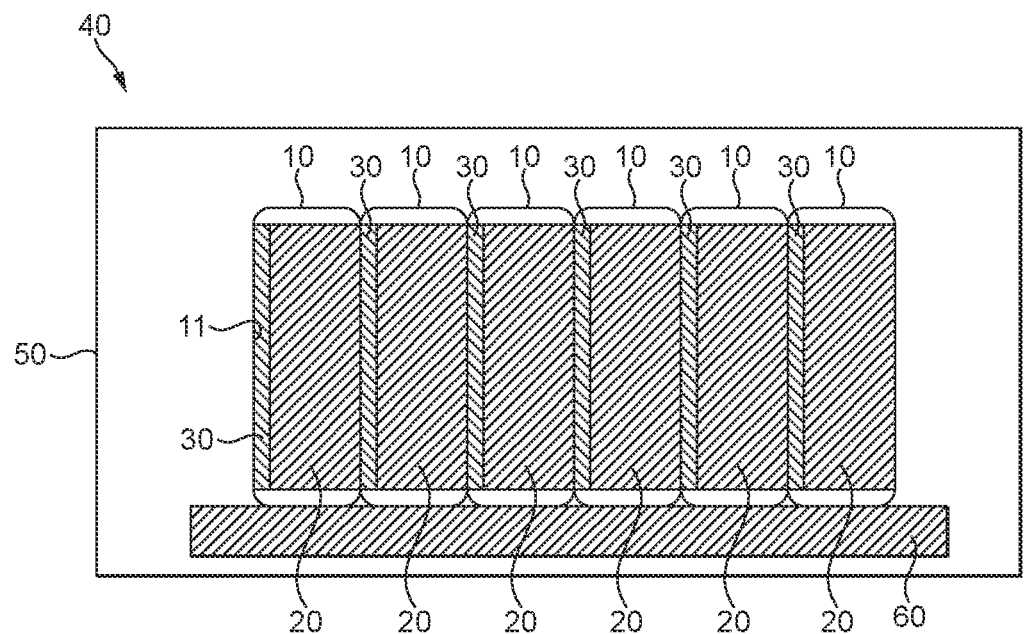
FIG. 3 shows a schematic cross-section of a battery comprising a plurality of the battery cells.

FIG. 3 shows a schematic cross-sectional illustration of a battery 40 comprising a plurality of battery cells 10. For reasons of consistency, the same reference numerals as used above are used throughout the description to indicate like features.

The battery 40 comprises six battery cells 10 arranged side by side. For reasons of clarity, the electrode assemblies 20 are shown in outline only. It will be understood that the electrode assemblies 20 could be configured in any suitable manner as discussed above.

Figure 4:
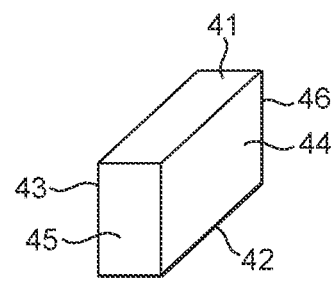
FIG. 4 shows a schematic view of a battery cell housing.

Each battery cell 10 comprises a housing 12 (FIG. 4) of generally rounded cuboid form having a first pair of substantially opposing first side faces 41, 42 which are substantially parallel to a first plane, a second pair of substantially opposing second side faces 43, 44 which are substantially parallel to a second plane, and a third pair of substantially opposing third side faces 45, 46 which are substantially parallel to a third plane, wherein the first, second and third planes are substantially normal to one another.

With reference to the orientation of FIG. 3, the first pair of side faces 41, 42 respectively form the top and bottom of the battery cells 10, the second pair of side faces 43, 44 respectively form the left and right of the battery cells 10, and the third pair of side faces 45, 46 respectively form the front and back of the battery cells 10. Each battery cell 10 comprises a layer of swelling compensation member material 30 located between the electrode assembly 20 and the inner surface 11 of the left side face (with respect to FIG. 3) of the housing 12.

A cooling member 60 in the form of a metal (or other thermally conductive material) plate is in thermal contact with the bottom faces of the battery cells 10. The cooling member 60 may be attached to the bottom faces of the battery cells 10 by mechanical fasteners and/or by adhesive. An outer housing 50 surrounds the battery cells 10 and cooling member 60.

Heat developed in the battery cells 10 during charging and discharging is removed from the battery cells via thermal conduction to the cooling member 60. The cooling member 60 may be cooled by a fan or other cooling system (not shown).

The cooling member 60 need not be in direct physical contact with the bottom of the battery cells 10 provided that it is in thermal contact with the battery cells 10. If desired, any suitable thermally conductive material may be placed between the cooling member 60 and the battery cells 10. Furthermore, it will be appreciated that the cooling member 60 may alternatively or additionally be in contact with any other faces of the battery cells 10 such as the top faces, front faces or back faces. Additionally, it will be appreciated that the battery 40 may comprise more than one cooling member 60.

The thermal compensation members 30 of the battery cells 10 of the battery 40 provide thermal insulation between the adjacent battery cells 10 to help prevent thermal run away of the entire battery 40 in the event that one of the battery cells 10 experiences thermal run-away.

Figure 5:
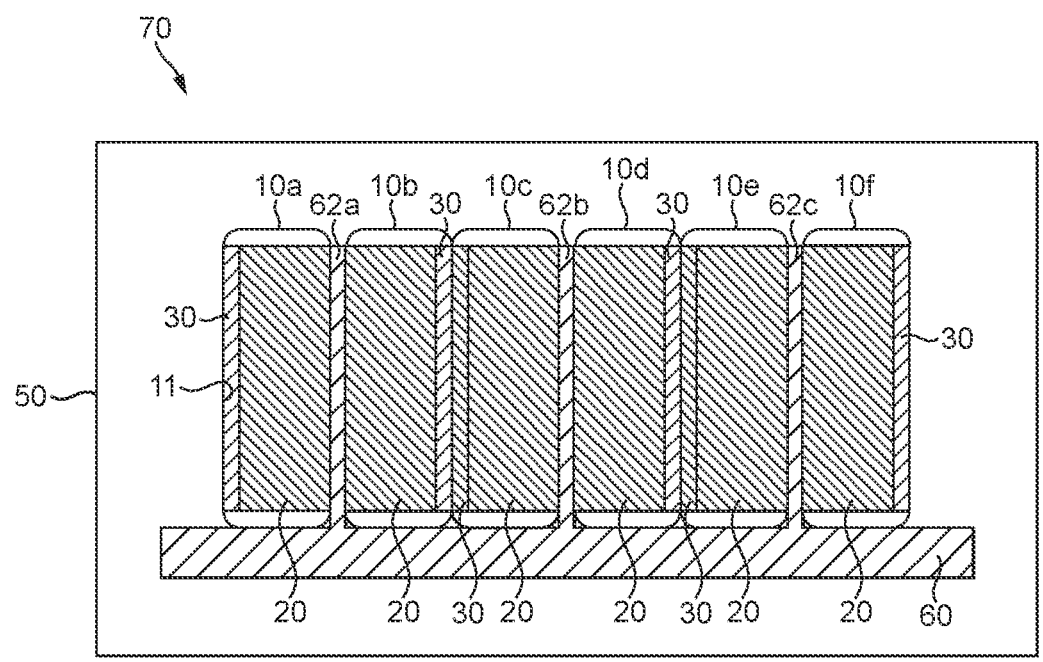
FIG. 5 shows a schematic cross-section of an alternative battery configuration comprising a plurality of the battery cells.

FIG. 5 shows an alternative battery configuration 70 comprising six battery cells 10a-f and a cooling member 60 located in an outer housing 50. In the battery configuration 70 of FIG. 5 the cooling member 60 comprises a plurality of fins 62a, 62b, 62c located respectively between, and in thermal contact with, the first and second battery cells 10a, 10b, third and fourth battery cells 10c, 10d, and fourth and fifth battery cells 10e, 10f.

Referring to the orientation of FIG. 5, the swelling compensation members 30 of the first 10a, third 10c, and fifth 10e battery cells are located between the electrode assemblies 20 and the inner surfaces 11 of the left side faces of the housings 12, and the swelling compensation members 30 of the second 10b, fourth 10d, and sixth 10f battery cells are located between the electrode assemblies 20 and the inner surfaces 11 of the right side faces of the housings 12. In this example, the side faces 43, 44 in contact with the swelling compensation members 30 are insulation side faces as the swelling compensation members 30 provide thermal insulation between the adjacent battery cells 10.

Conversely, the innermost surfaces of the side faces 43, 44 of the battery cells 10a-f in thermal contact with the cooling fins 62a-c are not in contact with the swelling compensation members 30. As a consequence, the thermal compensation member material 30 does not impede the transfer of heat from the battery cells to the cooling fins. Therefore, in this example, the side faces 43, 44 in contact with the cooling fins 62a-c are cooling side faces.

As above for the battery 40 of FIG. 3, the thermal compensation members 30 of the adjacent battery cells not in thermal contact with the cooling fins 62a-c provide thermal insulation between adjacent battery cells to help prevent thermal run away of the entire battery 70 in the event that one of the battery cells 10a-f experiences thermal run-away.

Although not shown, if desired cooling fins 62 may be located between one or more of the cells 10 of FIG. 3. In such an example the swelling compensation members 30 may impede the transfer of heat from the battery cell 10 to the cooling fin 62. However, such an arrangement does not preclude the use of cooling fins 62 if desired. Furthermore, the material of the swelling compensation members 30 may be selected, or engineered, to be thermally conductive. The cooling fins 62 may comprise a solid layer of thermally conductive material, or may comprise a mesh, fingers or any other suitable configuration. More than one cooling fin 62 may be located between adjacent battery cells 62. The cooling fins 62 may contact any face of the battery cells, in particular the left, right, front and back faces (in the orientation of FIGS. 3 and 5).

Although the batteries 40, 70 of FIGS. 3 and 5 have been described as having generally rounded cuboid form cell housings 12, it will be appreciated that any shape of battery cell may be used. In addition, the housings 12 of the battery cells 10, and the outer housing 50 of the batteries 40, 70 may comprise rigid housings or pouch cell housing or any combination thereof. The outer housings 50 of the batteries 40, 70 are not essential and may be omitted if desired.

The invention claimed is:

1. A battery comprising:
   a cell assembly comprising:
      an electrode assembly and an electrolyte;
      a housing containing the cell assembly; and
      a swelling compensation member; and
   a cooling member in thermal contact with the outermost surface of the housing;
   wherein the swelling compensation member is configured to be in contact with the electrode assembly and an innermost surface of the housing, such that a first portion of the innermost surface of the housing is in contact with the swelling compensation member, and a second portion of the innermost surface of the housing is free from contact with the swelling compensation member, and
   wherein at least a part of the outermost surface of the housing in contact with the cooling member corresponds to at least part of the innermost surface of the housing which is free from contact with the swelling compensation member; and
   wherein the swelling compensation member contains electrolyte for use in the battery cell.

2. The battery as claimed in claim 1, wherein the swelling compensation member comprises a material having an at least semi-open porous structure, and wherein, in use, the swelling compensation member is configured to shrink in at least one dimension upon swelling of the electrode assembly, and to expand in at least one dimension upon on shrinking of the electrode assembly.

3. The battery as claimed in claim 2, wherein the pores of the swelling compensation member contain the electrolyte for use in the battery cell.

4. The battery as claimed in claim 1, comprising one or more swelling compensation members.

5. The battery as claimed in claim 1, wherein the housing comprises a flexible pouch material or a substantially rigid material.

6. The battery as claimed in claim 1, wherein the housing is substantially cuboid in form such that the housing comprises three pairs of substantially opposing side walls which pairs are substantially normal to one another, wherein the cooling member is substantially parallel to a first pair of side walls, and wherein the swelling compensation member is substantially parallel to a second or a third pair of side walls.

7. The battery of claim 1, comprising a plurality of the cell assemblies, wherein two or more cell assemblies are arranged side by side and share the cooling member.

8. The battery as claimed in claim 7, wherein the cooling member comprises one or more cooling fins located between first and second neighboring cell assemblies, wherein each cooling fin is in thermal contact with a second side face of the first cell assembly and a second side face of the second cell assembly, wherein the second side faces of the first and second cell assemblies in contact with the cooling fin(s) are cooling side faces of the first and second cell assemblies respectively.

9. The battery as claimed in claim 8, wherein the innermost surface of the cooling side face of the first cell assembly, and the innermost surface of the cooling side face of the second cell assembly are free from contact with the respective swelling compensation member of the first and second cell assemblies.

10. The battery as claimed in claim 9, comprising a third battery cell assembly located side by side and neighboring with the second battery cell assembly such that a second side face of the third cell assembly is adjacent to a second side face of the second cell assembly, wherein the adjacent side faces of the second and third cell assemblies are insulating side faces of the second and third cell assemblies respectively, wherein the innermost surface of the insulating side face of the third cell assembly and the innermost surface of the insulating side face of the second cell assembly are in contact with the respective swelling compensation member of the second and third cell assemblies.

* * * * *